(12) United States Patent
Konrad et al.

(10) Patent No.: US 8,096,171 B2
(45) Date of Patent: Jan. 17, 2012

(54) DIAGNOSTIC METHOD FOR AN INTERNAL COMBUSTION ENGINE EXHAUST GAS SYSTEM THAT INCLUDES A PARTICLE FILTER

(75) Inventors: Joachim Konrad, Weil der Stadt (DE); Yi Liu, Northville, MI (US); Emmanuel Routier, Stuttgart (DE); Kevin Sisken, Saline, MI (US); Patrick Wolf, Gaeufelden (DE); Peter Schimmelpfennig, Erlangen (DE)

(73) Assignees: Daimler AG, Stuttgart (DE); Conti Temic microelectronic GmbH, Nuremberg (DE)

( * ) Notice: Subject to any disclaimer, the term of this patent is extended or adjusted under 35 U.S.C. 154(b) by 295 days.

(21) Appl. No.: 12/613,302

(22) Filed: Nov. 5, 2009

(65) Prior Publication Data
US 2011/0100094 A1    May 5, 2011

(51) Int. Cl.
*G01M 15/10* (2006.01)
(52) U.S. Cl. .................................................. 73/114.76
(58) Field of Classification Search ............... 73/114.69, 73/114.75, 114.76
See application file for complete search history.

(56) References Cited

U.S. PATENT DOCUMENTS

| | | | |
|---|---|---|---|
| 7,340,887 B2 | 3/2008 | Ante et al. | |
| 7,650,781 B2* | 1/2010 | Keski-Hynnila et al. | .. 73/114.76 |
| 2007/0251214 A1* | 11/2007 | Nishino et al. | ............... 60/277 |
| 2008/0155970 A1* | 7/2008 | Keski-Hynnila et al. | ....... 60/295 |
| 2008/0156084 A1* | 7/2008 | Keski-Hynnila et al. | .. 73/114.69 |
| 2009/0084097 A1* | 4/2009 | Sato et al. | ...................... 60/311 |

FOREIGN PATENT DOCUMENTS

DE    42 26 055 C1    9/1994
DE    10 2004 026 589 A1    1/2006

* cited by examiner

*Primary Examiner* — Eric S McCall
(74) *Attorney, Agent, or Firm* — Crowell & Moring LLP

(57) ABSTRACT

In a method for the diagnostics of an internal combustion engine exhaust gas system that includes a particle filter, first and second sets of value vectors are determined, each including associated values for absolute pressure upstream and downstream of the particle filter, a differential pressure determined from the values of the absolute pressure, an exhaust gas volume flow through the particle filter, and a temperature of the exhaust gas volume flow. After a temperature-standardization of the pressure values, characteristics for dependence of the pressure values are generated from temperature-standardized values of the first set of value vectors and possibly stored as reference characteristics. By comparing temperature-standardized values for the absolute pressure on the inlet and outlet sides of the particle filter and the differential pressure of the second set of value vectors with reference characteristics, flow anomalies can be determined in the exhaust gas system.

7 Claims, 1 Drawing Sheet

DIAGNOSTIC METHOD FOR AN INTERNAL COMBUSTION ENGINE EXHAUST GAS SYSTEM THAT INCLUDES A PARTICLE FILTER

BACKGROUND AND SUMMARY OF THE INVENTION

The present invention relates to a method for the diagnosis of an internal combustion engine exhaust gas system that includes a particle filter. In particular the invention provides a method for determining a flow anomaly in the exhaust gas system, based on a volume flow dependence of pressure values in the exhaust gas system.

The use of particle filters to remove particles from the exhaust gas of motor vehicle internal combustion engines is common. However, such filtering leads to clogging of the particle filter over time, so that flow-through resistance increases in an undesired manner. For this reason, it is common to carry out a regeneration of the filter from time to time, so that soot particles collected in the particle filter are burnt off.

The necessity of a particle filter regeneration is often determined by evaluating the value of differential pressure across the particle filter. German patent document DE 42 26 055 C1, for example, discloses a method in which the differential pressure over the particle filter is measured and compared to a differential pressure of a constant throttle location in the exhaust gas system. In this manner, the influence of a (usually present) lack of stationarity of the exhaust gas flow with correspondingly alternating differential pressure ratios is considered, and a conclusion can be drawn with regard to the loading degree of the particle filter, essentially independent from the exhaust gas volume flow.

German patent document DE 10 2004 026 589 A1 discloses a method for monitoring a particle filter by which both the loading state and breakage of the filter can also be determined. For this purpose, a filter loading value is determined based on determined pressure loss values across the particle filter and an exhaust gas volume flow through the particle filter; and its temporal development is viewed. If it is determined that the derivative of the filter loading value is less than zero, a filter breakage is diagnosed.

One object of the present invention is to provide a method which permits more comprehensive diagnostics of an internal combustion engine exhaust gas system comprising a particle filter.

This and other objects and advantages are achieved by the method according to the invention, in which first and second sets of a plurality of value vectors are determined, wherein the values of each value vector are associated with each other and represent i) an absolute pressure upstream of the particle filter, ii) an absolute pressure downstream of the particle filter, iii) a differential pressure (determined from the values of the absolute pressure upstream and downstream of the particle filter), iv) an exhaust gas volume flow through the particle filter, and v) a temperature of the exhaust gas volume flow, respectively. The determined values for the absolute pressure upstream and downstream of the particle filter, and the differential pressure at least of the first set of value vectors are transformed to temperature-standardized values so that temperature dependence is eliminated, or nearly eliminated. Based on the temperature-standardized values of the first set of value vectors, characteristics are generated for dependence of the absolute pressure upstream and downstream of the particle filter and the differential pressure, on the volume flow. These characteristics are stored as reference characteristics.

Values for the absolute pressure upstream and downstream of the particle filter and the differential pressure of the second set of value vectors, are compared to corresponding pressure values derived from the reference characteristics, and the result is evaluated with regard to a flow anomaly in the exhaust gas system. Leakage or clogging of the exhaust gas system (or a component installed therein) is thus understood as a flow anomaly.

A set of value vectors typically comprises from about a hundred up to a few thousand value vectors and is determined over a longer period of time (typically 5 min to 50 min). In practice, the determined values for the absolute pressure upstream and downstream of the particle filter are thus within a relatively broad value region for the exhaust gas volume flow, and it is not difficult to generate pressure or differential pressure volume flow characteristics therefrom. This is advantageous for the reliability of the diagnostics method, as the reliability of the diagnostics result is improved due to the plurality of considered values. The values for the absolute pressure upstream and downstream of the particle filter, the exhaust gas flow and the associated temperature are thereby preferably synchronized and determined at least approximately simultaneously, and stored as components of a respective value vector.

A further improvement of the reliability is obtained by eliminating the physically caused temperature dependence of the pressure values according to the invention. In this way, interpretable pressure values can be determined, even with typically changing flow and temperature ratios for motor vehicle uses. The temperature dependence of the pressure values is preferably eliminated by considering the parameters for exhaust gas density and dynamic viscosity of the exhaust gas. For these parameters, temperature dependence is preferably represented in the form of a characteristic. Together with the exhaust gas temperature sensed parallel to the pressure values, the formation of temperature-standardized pressure values is thus facilitated.

To determine the exhaust gas volume flow, the fuel and combustion air amounts implemented per unit of time are preferably consulted. These values are often available in an engine control device in any case. The values for exhaust gas volume flow are preferably also standardized to preset pressure and/or temperature reference conditions, so that dependencies of pressure and/or temperature are also eliminated.

Preferably, the standardized exhaust gas volume flow values are used to generate the characteristics or reference characteristics. The absolute pressure values downstream and upstream of the particle filter are preferably determined in a measurement-technological manner using suitably arranged absolute pressure sensors. The absolute pressure sensors can be arranged immediately on the inlet side or the outlet side of the particle filter body, or also a bit farther upstream or downstream in the exhaust gas system. The differential pressure can be obtained simply by subtraction of the absolute pressure values. The temperature of the exhaust gas flowing through the particle filter is conveniently sensed in a measurement-technological manner, using a temperature sensor arranged on the inlet side and/or outlet side of the particle filter and/or in the particle filter.

The second set of value vectors is preferably determined temporally following the first set. Values of the second set, which were determined with preset or presettable conditions with regard to preset or presettable exhaust gas and/or internal combustion engine operating parameters, or fall within preset or presettable value regions, are preferably consulted for comparison with pressure values derived from the reference characteristics. A comparison of for example differential pressure values of the second set of value vectors with pressure values derived from the reference characteristic for the differential pressure preferably entails comparing a plurality of value pairs for the differential pressure and the associated exhaust gas volume flow with the corresponding value pairs of the reference characteristic for the differential pressure.

If the differential pressure values of the second set of value vectors are outside a preset or presettable confidence interval relative to the reference characteristic values, a flow anomaly is possibly diagnosed. (For this comparison, temperature-standardized or de-standardized pressure values can be consulted; pressure values of the second set of value vectors with corresponding pressure values calculated back from reference characteristic values related to the present temperatures are preferred.) If no irregularities are determined during the evaluation of the comparison result, new characteristics or reference characteristics are generated from the values of the second set of value vectors, and stored. In this manner, updated characteristics which are adapted to the respective conditions are continuously available. This has the advantage that erroneous diagnostics due to long term drift effects can be avoided and normal gradually occurring changes are not erroneously diagnosed as a flow anomaly, The determination of three different pressure values (that is, the absolute pressure on the inlet side and the outlet side of the particle filter, and the differential pressure over the particle filter) provided according to the invention is especially advantageous. It facilitates a differentiating evaluation at least with regard to leakage of an exhaust gas line section downstream of the particle filter, leakage of an exhaust gas line conducting section upstream of the particle filter, and a breakage of the particle filter in the arrangement of the invention, Especially, evaluation of comparison results obtained separately for the two absolute pressure values and for the differential pressure with regard to the stored reference characteristic values, facilitates a differentiation of the mentioned flow anomalies. This technique has proved to be particularly advantageous in practice, because it avoids an unnecessary change of a particle filter erroneously diagnosed as being broken. Such an erroneous diagnosis is especially possible, if a leakage occurs in an exhaust gas line section upstream of the particle filter, with a lowering of a back pressure on the inlet side of the particle filter resulting therefrom. With an exclusively differential pressure sensing, for example by a differential pressure sensor, the danger of an erroneously diagnosed filter breakage becomes large, with a corresponding high probability of incurring the cost of an unnecessary filter change.

In a further embodiment of the method according to the invention, clogging of the particle filter and/or an exhaust gas cleaning unit connected upstream or downstream of the particle filter is evaluated. For recognizing these flow anomalies, the determination of the three different pressure values provided according to the invention is again advantageous. In particular, determination of the absolute pressure downstream of the particle filter makes it possible to distinguish between a filter breakage and a clogged exhaust gas cleaning unit arranged downstream of the particle filter. If only differential pressure is sensed, an unacceptably high absolute pressure downstream of the particle filter but upstream of the exhaust gas cleaning unit connected downstream, could be diagnosed erroneously as filter breakage, despite the fact that clogging of the exhaust gas cleaning unit downstream of the particle filter is the more probable flow anomaly.

The process according to the invention facilitates a goal-oriented and successful initiation of measures for removing the flow anomaly. The recognition of clogging occurring downstream of the particle filter is especially advantageous when using a downstream SCR catalyst, because the danger of clogging by urea deposits due to a supply of aqueous urea solution is increased in that case. An exhaust gas cleaning unit arranged upstream of the particle filter is preferably formed as oxidation catalyst. A clogging can occur in this case by fuel coking, for example due to a fuel addition for an enforced particle filter regeneration.

In a further embodiment of the method according to the invention, for generating the characteristics for the dependence of the absolute pressure on the inlet side and the outlet side of the particle filter and of the differential pressure of the volume flow, temperature-standardized values of the first set of value vectors are fed to a Kalman filter algorithm. Starting with the knowledge that at least approximately a normal (Gaussian) distribution exists for the uncertainty of the sensed values, the application of the Kalman filter algorithm facilitates the determination of characteristics with an error as small as possible. In other words, due to the procedure according to the invention, the most probable characteristics are determined, whereby the evaluation of the comparison results is facilitated with a maximum reliability.

In a further embodiment of the method according to the invention, for generating the characteristics only those values for the absolute pressure upstream and downstream of the particle filter and the differential pressure of the first set of value vectors are used, which were obtained in a first presettable region for exhaust gas volume flow and/or a presettable region for temperature of the exhaust gas volume flow, thereby further enhancing the probable accuracy of the diagnostics result. A region between 50 $m^3/h$ and 500 $m^3/h$ is preferably preset for the volume flow for an internal combustion engine with a displacement of 10 l, and a region between 150° C. and 550° C. is preferably preset for the temperature of the exhaust gas volume flow. The value region for the exhaust gas absolute pressure can also be preset. A mutual dependence of the allowed value regions of exhaust gas temperature, pressure and volume flow can also be provided.

A further improvement of the diagnostics result can be achieved if only those values for absolute pressure upstream and downstream of the particle filter and the differential pressure of the second set of value vectors which were obtained in a second presettable region for the exhaust gas volume flow are taken into account for the purpose of comparison with pressure values derived from the reference characteristics, to determine a flow anomaly. The value region is preferably chosen smaller with regard to a preset or a first presettable value region. A value region with a lower limit of at least 600 $m^3/h$ to 800 $m^3/h$ is preferred. Further limitations can of course be provided for the use of values of the second set of value vectors for the purpose of comparison. In particular, a virtual steady state of the operation of the internal combustion engine can be requested, which is defined by an admissible fluctuation range for the speed and/or released torque.

According to a further embodiment of the method, characteristics obtained from values which were determined in a presettable temporal distance after a first startup of the particle filter and/or after a forced particle filter regeneration are used as reference characteristics. In this manner, defined comparison conditions are provided, or inlet or start-up effects are faded out.

Other objects, advantages and novel features of the present invention will become apparent from the following detailed

DETAILED DESCRIPTION OF THE DRAWINGS

Figure 1:
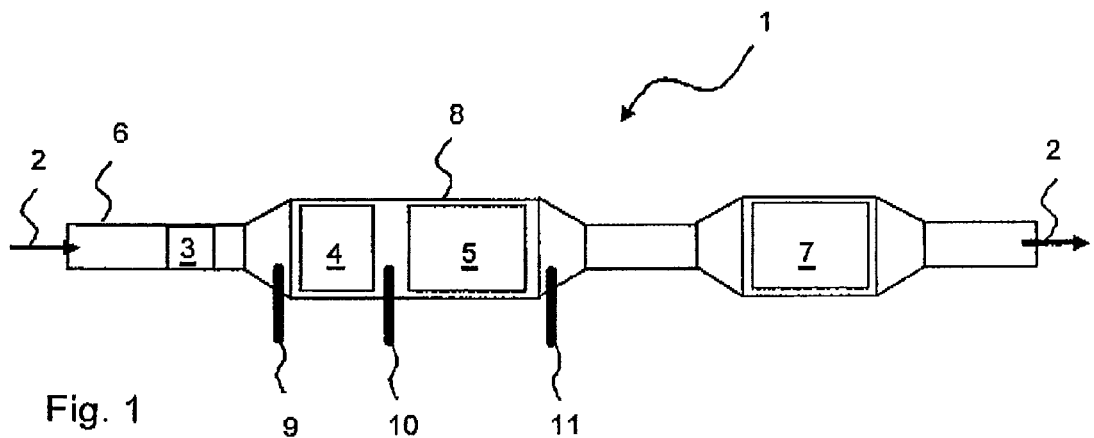
FIG. 1 is a schematic block diagram of an exhaust gas system of a motor vehicle internal combustion engine, for which the diagnostics method according to the invention can be used with advantage.

FIG. 1 is a schematic diagram of an exhaust gas system 1 to be diagnosed with regard to a flow anomaly. Arranged consecutively in the exhaust gas flow direction 2, it includes a precatalyst 3 designed as an oxidation catalyst, a main catalyst 4 designed as an oxidation catalyst, a particle filter 5, and an SCR catalyst 7. The exhaust gas system 1 is connected to an internal combustion engine (not shown) preferably in the form of a diesel motor, via an exhaust gas line 6 in a piston design. If an exhaust gas turbocharger is provided, a connection to an outlet of the exhaust gas turbocharger turbine is preferred.

The precatalyst 3 preferably comprises a coated carrier catalyst, especially a metal foil catalyst. This facilitates an at least force-fit and material connection with the exhaust gas line 6 in sections in an advantageous manner, for example in the form of a soldering or welding connection. An arrangement with a small distance to the main catalyst 4 is thereby preferred.

The precatalyst 3 is preferably relatively small, with a volume of less than 10% of the displacement of the connected internal combustion engine, and comprises a lower cell density of preferably about 50 cpsi with an L/D ratio of less than 1.0, such that comparatively low pressure loss values over the precatalyst 3 result. In a preferred embodiment, the main catalyst 4 comprises a L/D ratio of about 1.5 to 2.25, a cell density of 300 cpsi to 400 cpsi, and a volume which is approximately 1.1 to 2.2 times. of the displacement of the connected internal combustion engine. The main catalyst 4 is presently situated with a small distance to the particle filter 5 together therewith in a common housing 8.

A so-called wall-flow filter, based on SiC, cordierite or aluminium titanate, is preferably used as particle filter 5, which can be provided with a catalytic coating preferably containing noble metals. For a high absorbency of soot and ash particles, a volume as high as possible of approximately 1.5 times of the engine displacement is advantageous. As the oxidation catalysts 3, 4 connected upstream already effect a certain back pressure, a design of the particle filter 5 that is optimized with regard to the exhaust gas counter pressure is preferred. The porosity and size are preferably set in such a manner that one goes below a counter pressure of about 100 mbar with a soot load of about 5 g/l in the predominant operation region of the internal combustion engine.

The SCR catalyst 7 connected downstream of the particle filter 5 is presently formed as a classic SCR catalyst on the basis of $V_2O_5/WO_3$ or as a supported catalyst coated with zeolite. An adding location with a dosing unit for adding a reduction means (not shown) is arranged between the particle filter 5 and the SCR catalyst 7. The reduction means for supporting a catalytic nitric oxide reduction at the SCR catalyst 7 is preferably an aqueous urea solution, For monitoring or diagnostics of the exhaust gas system 1 with regard to a flow anomaly, sensors are provided to sense operating magnitudes of the exhaust gas system 1 and the internal combustion engine. Particularly, sensors are provided for the absolute pressure upstream and downstream of the particle filter 5, and for the exhaust gas temperature in the region of the particle filter 5. In FIG. 1, temperature and/or absolute pressure sensors are designated with the reference numerals 9, 10, 11. The absolute pressure measurements can take place with sensors arranged immediately at the inlet or outlet side or with sensors arranged a bit farther away, for example in the inlet or outlet hopper of the housing 8. In the following, it is assumed, without restricting the generality, that the sensors 10, 11 are absolute pressure sensors for sensing the exhaust gas absolute pressures $p_v$, $p_n$ on the inlet side or upstream and on the outlet side or downstream of the particle filter 5, and that a sensing of the temperature T of the exhaust gas flowing through the particle filter 5 takes place with one or several of the sensors 9, 10, 11. For determining an intake air amount of the internal combustion engine, an air mass meter is provided in an intake air line (not shown).

The provided sensors are connected to an electronic data processing unit, (not shown), which can for example be integrated in an electronic engine control device, and which has input and output, memory and calculating units in a usual manner. The data processing unit can carry out complex control and calculation processes in which stored characteristics or characteristic zones are possibly referred to. A calculation of an exhaust gas volume flow Q by means of the measurement-technologically sensed intake air amount and a fuel usage and possibly further magnitudes emitted by the internal combustion engine or flowing through the particle filter 5 takes place for example.

Diagnosis of the exhaust gas system 1 according to the invention proceeds as follows: Measuring values from the sensors are imported in a temporally synchronized manner (that is, within a time of about 0.1 to 1 s), and values for the absolute pressure $p_v$ upstream of the particle filter 5, the absolute pressure, $p_n$ downstream of the particle filter 5, the exhaust gas temperature T and the exhaust gas volume flow Q are derived therefrom. Additionally, a differential pressure 4 is determined from the values for the absolute pressure ($p_v$, $p_n$) upstream and downstream of the particle filter 5. The differential pressure $\Delta p$ is conveniently determined by a subtraction according to $\Delta p = p_v - p_n$ and gives the pressure loss over the particle filter 5 or the one of the entirety of the main catalyst 4 and the particle filter 5. The values determined at time i thus form components of a value vector $V_i$ of the form $$V_i = [p_{v,i}, p_{n,i}, \Delta p_i, T_i, Q_i]$$

The value vectors $V_i$ are stored at least temporarily. It can thereby be provided to only consider those value vectors $V_i$ with whose sensing presettable or preset boundary conditions are observed with regard to the respective operating point. These boundary conditions can for example relate to a region for the exhaust gas volume flow Q, the exhaust gas temperature T, speed and/or torque changes and the like.

In addition to a dependence on the exhaust gas volume flow Q, the pressure values $p_v$, $p_n$, $\Delta p$ also depend on the exhaust gas temperature T, which impedes their direct evaluation. For this reason, a temperature standardization takes place so that the dependence on the exhaust gas temperature T is eliminated. The temperature standardization thereby considers at least the temperature-dependent dynamic viscosity $\mu(T)$ of the exhaust gas and the temperature-dependent density $\rho(T)$ of the exhaust gas, which primarily effect the temperature dependence of the pressure values $p_v$, $p_n$, $\Delta p$. The temperature standardization preferably comprises a multiplicative connection of the sensed pressure values $p_v$, $p_n$, $\Delta p$ with a standardization factor defined by $\rho(T)/(\mu(T))^2$. For this purpose, the values for the dynamic viscosity $\mu(T)$ and temperature-dependent density $\rho(T)$ of the exhaust gas are preferably represented in the form of a characteristic. For the exhaust gas volume flow Q, a standardization to presettable standard conditions, for example 0° C. and 1013 hPa, is preferably also provided.

If a defined presettable number of value vectors $V_i$ are present for example by covering a preset region for the exhaust gas volume flow Q, characteristics K are generated from the temperature-standardized pressure values $p_v$, $p_n$, $\Delta p$ of this present set of value vectors, which respectively give a dependence of these values on the exhaust gas volume flow Q related to standard conditions, which is explained below with reference to FIG. 2.

Figure 2:
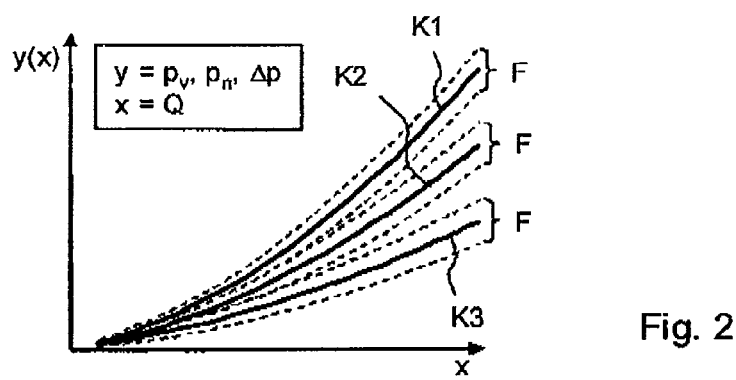
FIG. 2 is a diagram with characteristics for explaining a preferred procedure during the execution of the diagnostics method according to the invention.

In FIG. 2 shows characteristics K1, K2, K3 generated as explained at different times. It is provided to store a respective characteristic, especially if this is within a preset or presettable error band F. An observation of an error band is preferably provided, if the characteristics K were generated at selected times, as for example within a presettable temporal separation relative to a new state of the particle filter 5 with fading of a so-called de greening process or for a regeneration process for the particle filter 5. For example, K1 can represent a characteristic stored as reference characteristic obtained during normal operation of the particle filter 5 (referred to herein as a reference operating characteristic). The characteristics K2, K3 can for example represent a reference characteristic obtained after an enforced particle filter regeneration or after a start-up time (degreening). The corresponding reference characteristics are designated as reference initial characteristic or reference degreening characteristic.

For generating the characteristics or the reference characteristics, the temperature-standardized values of the set of value vectors $V_i$ are presently supplied to a Kalman filter. The Kalman filter algorithm calculates error-minimized characteristics of the form $y=f(x)$ by the respective number of associated value pairs of temperature-standardized pressure values ($p_v$, $p_n$, $\Delta p$) as y values and associated x values for the standardized volume flow Q. Error-standardized characteristics of the form $y=A*Q+B*Q^2$ with $y=p_v$, $p_n$, $\Delta p$ are preferably generated.

After completing one set of value vectors $V_i$, the sensing of a new, second set of value vectors $V_i$ is started, preferably proceeding as with the sensing of the first set.

It can be provided to compare a new operating characteristic K1' for the differential pressure $\Delta p$ obtained during a normal operation with a previously stored reference operating characteristic K1 for the differential pressure $\Delta p$. If the new differential pressure operating characteristic K1' lies within the set error band F, the exhaust gas system 1 is found to be correct and error-free with regard to a flow anomaly. In this case, it is provided in a preferred manner to overwrite the previously valid reference operating characteristic K1 for the differential pressure $\Delta p$ with the new differential pressure operating characteristic K1' and to represent the latter as the new reference operating characteristic K1 for the diagnostics of the running operation. The further reference operating characteristics K1 for the pressures $p_v$, $p_n$, on the inlet side and the outlet side of the particle filter 5 can also be overwritten. Due to a repeated overwriting, reference operating characteristics K1 are continuously generated, which sense a naturally occurring gradual accumulation of soot particles and ash particles in the particle filter 5.

Furthermore, it can be provided to compare the obtained new operating characteristic K1' for the differential pressure $\Delta p$ with a corresponding reference characteristic K2 obtained after a filter regeneration or with a reference initial characteristic K2 and/or a reference degreening characteristic K3 for the differential pressure $\Delta p$. If the new differential pressure operating characteristic is below the defined error band F or within a presettable distance below the reference characteristic K2 and/or K3, it is concluded that there is a flow anomaly in the form of a filter breakage, and a corresponding error message is generated. If the new differential pressure operating characteristic K1' is above the defined error band F or in a presettable distance above the reference initial characteristic K2, it is concluded that the particle filter 5 must be regenerated, and a corresponding message is generated, especially a regeneration request. It is preferably provided to generate and store a new reference initial characteristic K2 for a freshly regenerated particle filter 5. An observance of a naturally gradually increasing ash accumulation is facilitated in this manner. This procedure further facilitates to recognize a cessation of a degreening process.

It is further provided to compare pressure values $p_v$, $p_n$, $\Delta p$ of the second set of value vectors $V_i$ with corresponding expected values for the same standardized exhaust gas volume flow Q, which can be taken from the stored associated reference operating characteristics K1. A deviation by falling below a respective error band F is thereby assessed as an anomaly or error.

In the following, it is assumed in an exemplary manner that a shortfall error flag srl=1 is set if a shortfall of the corresponding reference characteristic value which exceeds a preset amount is determined with a presettable number of values or a presettable percentage of values of the second set of value vectors Vi. If no shortfall is determined, srl remains not set (srl=0). It is clear that a comparison evaluation can additionally be connected to further boundary conditions as for example the presence of a presettable region for exhaust gas volume flow and/or exhaust gas temperature. If $K1(p_v)$, $K1(p_n)$ and $K1(\Delta p)$ are designated as reference operating characteristics K1 for the absolute pressure ($p_v$, $p_n$) upstream and downstream of the particle filter 5 and for the differential pressure $\Delta p$ obtained therefrom, a flow anomaly according to the following error matrix is diagnosed:

| Anomaly type | Filter breakage | Leakage upstream particele filter | Leakage downstream particle filter |
| --- | --- | --- | --- |
| Comparison with | | | |
| K1 ($\Delta p$) | srl = 1 | srl = 1 | srl = 0 |
| K1 ($p_v$) | srl = 1 | srl = 1 | srl = 1 |
| K1 ($p_n$) | srl = 0 | srl = 1 | srl = 1 |

In this table, the flow anomaly "leakage upstream of the particle filter" is understood especially as a leakage in a section of the exhaust gas line 6 upstream of the precatalyst 3, with a missing precatalyst 3 upstream of the main catalyst 4. Such a leakage is thus diagnosed if significant shortfalls of the pressure values derived from corresponding reference operating characteristics are determined for values for $\Delta p$ and $p_v$ and $p_n$. The flow anomaly "leakage downstream of the particle filter" refers to a leakage in a section of the exhaust gas line 6 between the particle filter 5 and the SCR catalyst 7. Such a leakage is thus diagnosed if significant shortfalls of the corresponding reference operating characteristics are determined for values $p_v$ and $p_n$, but not for $\Delta p$.

In a analogous manner the pressure values $p^v$, $p_n$, $\Delta p$ of the second set of value vectors $V_i$ can be compared with corresponding expectation values for the same standardized exhaust gas volume flow Q, (which can be taken from the stored associated reference operating characteristics K1) and. to thereby assess a deviation by exceeding a respective error band F as anomaly or error. If an exceeding error is marked by setting an error flag srh, an evaluation with regard to a flow anomaly can be provided according to the following error matrix:

| Anomaly type<br>Comparison with | Filter clogged | SCR cat clogged |
| --- | --- | --- |
| K1 ($\Delta p$) | srh = 1 | x |
| K1 ($p_v$) | x | x |
| K1 ($p_n$) | x | srh = 1 |

In this manner, a differentiating comparison evaluation with a more comprehensive exhaust gas system diagnostics is facilitated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of diagnosing an internal combustion engine exhaust gas system that includes a particle filter, said method comprising:
   determining first and second set of value vectors, each vector comprising associated values for an absolute pressure upstream and downstream of the particle filter, a differential pressure determined from the absolute pressure values, an exhaust gas flow volume through the particle filter, and a temperature of the exhaust gas volume flow;
   determining temperature-standardised values for the absolute pressure upstream and downstream of the particle filter, and for the differential pressure, at least for the values of the first set of value vectors, such that temperature dependence for the values of the absolute pressure upstream and downstream of the particle filter and the differential pressure is substantially eliminated;
   based on the temperature-standardized values of the first set of value vectors, generating characteristics which represent dependence of the absolute pressure upstream and downstream of the particle filter, and of the differential pressure, on the volume flow;
   storing the characteristics as reference characteristics;
   comparing values for the absolute pressure upstream and downstream of the particle filter and the differential pressure of the second set of value vectors with pressure values derived from the reference characteristics;
   evaluating a comparison result with regard to a flow anomaly in the exhaust gas system.

2. The method according to claim 1, wherein a differentiating evaluation is carried out at least with regard to at least one of leakage of an exhaust gas conducting section upstream of the particle filter, leakage of an exhaust gas guiding section downstream of the particle filter, and breakage of the particle filter.

3. The method according to claim 2, wherein the evaluation is carried out with regard to clogging of one of the particle filter and an exhaust gas cleaning unit connected in the exhaust gas system.

4. The method according to claim 1, wherein for generating the characteristics for the dependence of the absolute pressure values and the differential pressure values on the volume flow, temperature-standardized values of the first set of value vectors are fed to a Kaiman filter.

5. The method according to claim 1, wherein for generating the characteristics, only those values for the absolute pressure and the differential pressure of the first set of values vectors are used, which are obtained in one of a first presettable region for the exhaust gas volume flow and a presettable region for the temperature of the exhaust gas volume flow.

6. The method according to claim 1, wherein for a comparison of values for the absolute pressure upstream and downstream of the particle filter and the differential pressure of the second set of value vectors with pressure values derived from reference characteristics for determining a flow anomaly, only values for the absolute pressure and the differential pressure of the second set of value vectors are considered, which were obtained in a second presettable region for the exhaust gas volume flow.

7. The method according to claim 1, wherein said characteristics that are used as reference characteristics, are obtained from values which were obtained within a presettable temporal space after a first startup of the particle filter and/or after a forced particle filter regeneration.

* * * * *